(12) United States Patent
Kinjo et al.

(10) Patent No.: US 11,900,735 B2
(45) Date of Patent: Feb. 13, 2024

(54) VOTING SYSTEM, VOTE RELAY SERVER, CLIENT TERMINAL, VOTING METHOD, ADVERTISEMENT DISTRIBUTION SYSTEM, AND PROGRAM

(71) Applicant: NIPPON TELEGRAPH AND TELEPHONE CORPORATION, Tokyo (JP)

(72) Inventors: Koha Kinjo, Tokyo (JP); Tetsuya Okuda, Tokyo (JP); Ryo Kikuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 524 days.

(21) Appl. No.: 17/058,590

(22) PCT Filed: May 28, 2019

(86) PCT No.: PCT/JP2019/021086
§ 371 (c)(1),
(2) Date: Nov. 24, 2020

(87) PCT Pub. No.: WO2019/230718
PCT Pub. Date: Dec. 5, 2019

(65) Prior Publication Data
US 2021/0125446 A1 Apr. 29, 2021

(30) Foreign Application Priority Data
May 29, 2018 (JP) .................. 2018-102629

(51) Int. Cl.
*G07C 13/00* (2006.01)
*H04L 9/08* (2006.01)
*H04L 9/30* (2006.01)

(52) U.S. Cl.
CPC .............. *G07C 13/00* (2013.01); *H04L 9/088* (2013.01); *H04L 9/0838* (2013.01); *H04L 9/30* (2013.01); *H04L 2209/463* (2013.01)

(58) Field of Classification Search
CPC ....... G07C 13/00; H04L 9/0838; H04L 9/088; H04L 9/30; H04L 2209/463
(Continued)

(56) References Cited

U.S. PATENT DOCUMENTS

| 6,813,357 B1 | 11/2004 | Matsuzaki et al. | |
|---|---|---|---|
| 7,048,186 B1 * | 5/2006 | Chandler | G07C 13/00 235/386 |
| 2018/0018198 A1 * | 1/2018 | Yang | G06F 11/187 |

FOREIGN PATENT DOCUMENTS

JP 2000-196581 A 7/2000

OTHER PUBLICATIONS

Yoneyama et al. (2016) "Multi-Cast Key Distribution: Scalable, Dynamic and Provably Secure Construction," ProvSec, 28 pages.

* cited by examiner

*Primary Examiner* — Daniel A Hess

(57) ABSTRACT

In a voting system including a vote broadcasting server and a plurality of client terminals, the vote broadcasting server generates a plurality of pieces of vote information that is data in which secret information is shared and transmits the vote information to each client terminal, each client terminal generates voting information by encrypting vote information such that the vote information can be decrypted when predetermined conditions are satisfied and transmits the voting information to the vote broadcasting server, the vote broadcasting server transmits a voting information group composed of voting information received from respective client terminals to the respective client terminals, and each client terminal ascertains a vote result according to the (Continued)

number of pieces of vote information decrypted from the voting information group and executes processing based on the vote result.

20 Claims, 12 Drawing Sheets

(58) Field of Classification Search
USPC ............................................... 235/386, 54 R
See application file for complete search history.

VOTING SYSTEM, VOTE RELAY SERVER, CLIENT TERMINAL, VOTING METHOD, ADVERTISEMENT DISTRIBUTION SYSTEM, AND PROGRAM

CROSS-REFERENCE TO RELATED APPLICATIONS

This application is a U.S. 371 Application of International Patent Application No. PCT/JP2019/021086, filed on 28 May 2019, which application claims priority to and the benefit of JP Application No. 2018-102629, filed on 29 May 2018, the disclosures of which are hereby incorporated herein by reference in their entireties.

TECHNICAL FIELD

The present invention relates to an encryption communication technology.

BACKGROUND ART

Recently, ad networks have received attention in Internet advertising. An ad network includes an advertisement distribution server interposed between an advertiser and a user terminal and allows efficient advertisement placement such as cost reduction in advertisement placement and targeting.

Meanwhile, in an encryption communication technology, End-to-End encryption using a method such as DMKD (refer to NPL 1) has received attention. In communication in which a server performs mediation, such as an ad network, demand for execution of encryption at a user end is rapidly increasing.

Furthermore, as an encryption communication technology for excluding a specific terminal from a communication group which is used in the case of loss of a terminal, a method of performing redistribution of a shared key is general and, for example, there is an exclusive key sharing method (refer to PTL 1).

CITATION LIST

Non Patent Literature

[NPL 1] Kazuki Yoneyama, Reo Yoshida, Yuto Kawahara, Tetsutaro Kobayashi, Hitoshi Fuji, Tomohide Yamamoto, Multi-Cast Key Distribution: Scalable, Dynamic and Provably Secure Construction, ProvSec (2016)

PATENT LITERATURE

[PTL 1] Japanese Patent Application Publication No. 2000-196581

SUMMARY OF THE INVENTION

Technical Problem

Advertisers who distribute advertisements and the like including inappropriate content to sites for children (referred to herein as corrupt advertisers) are present in ad networks. As means for excluding corrupt advertisers in many-to-many communication such as ad networks, the aforementioned exclusive key sharing method is conceivable.

However, when ad networks demand End-to-End encryption in the future, this method may become a problem because reporters and exception targets are known to a server side. In exclusion of corrupt advertisers, it is not easy to control exclusion of corrupt advertisers while concealing information from the server side. Further, the aforementioned problem of excluding a communication participant while concealing information from the server side may be present without being limited to ad networks.

An object of the present invention devised in view of the aforementioned circumstances is to provide a technology which can exclude a participant while concealing information from a server side in End-to-End encryption communication via a server.

Means for Solving the Problem

According to the disclosed technology, there is provided a voting system including a vote broadcasting server and a plurality of client terminals, in which the vote broadcasting server generates a plurality of pieces of vote information that is data in which secret information is shared and transmits the vote information to each client terminal, each client terminal generates voting information by encrypting vote information such that the vote information can be decrypted when predetermined conditions are satisfied and transmits the voting information to the vote broadcasting server, the vote broadcasting server transmits a voting information group composed of voting information received from respective client terminals to the respective client terminals, and each client terminal ascertains a vote result according to the number of pieces of vote information decrypted from the voting information group and executes processing based on the vote result.

Effects of the Invention

According to the disclosed technology, a technology which can exclude a participant while concealing information from a server side in End-to-End encryption communication via a server is provided.

DESCRIPTION OF EMBODIMENTS

Hereinafter, a first embodiment and a second embodiment will be described as embodiments of the present invention.

First Embodiment

First, the first embodiment will be described on the basis of the drawings.

<System Configuration>

Figure 1:
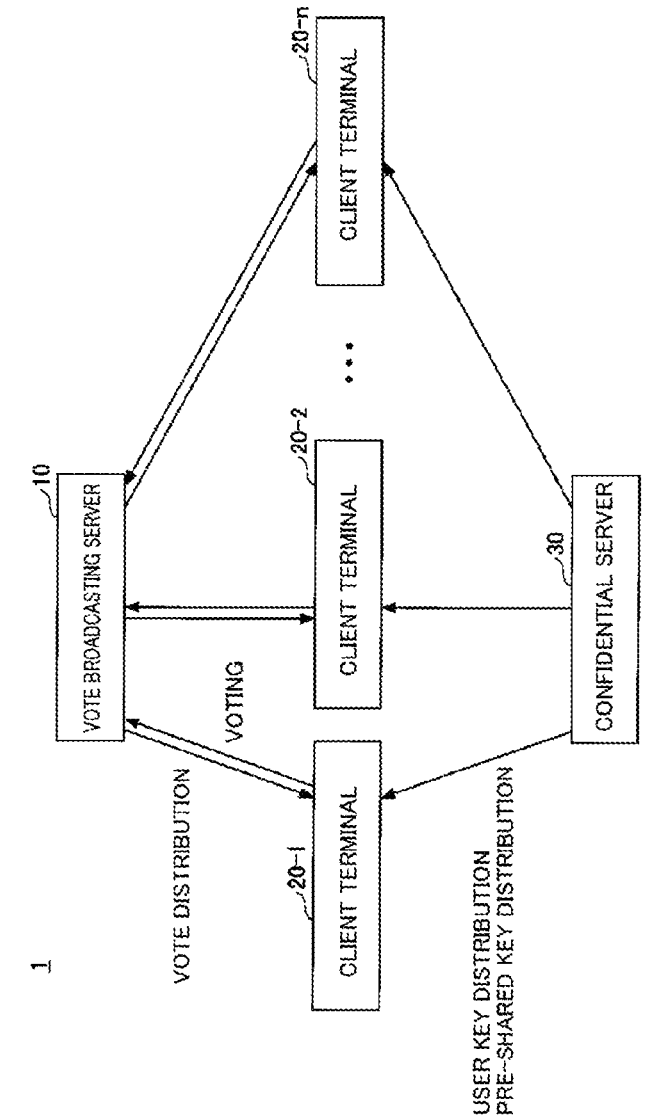
FIG. 1 is a diagram showing a configuration example of a voting system in a first embodiment.

FIG. 1 is a diagram showing a configuration example of a voting system 1 in the first embodiment. As shown in FIG. 1, the voting system 1 includes a vote broadcasting server 10, a client terminal group 20 including two or more client terminals such as client terminals 20-1 and 20-2, a confidential server 30, and the like.

The vote broadcasting server 10 and the client terminal group 20, and the confidential server 30 and the client terminal group 20 are connected via a network. In addition, it is assumed that authentication is performed between the vote broadcasting server 10 and the client terminal group 20 according to a public key infrastructure or the like and authentication is also performed between the confidential server 30 and the client terminal group 20 according to the public key infrastructure or the like.

The vote broadcasting server 10 is a device which transmits vote information to the client terminal group 20 which requests a vote, receives voting information from the client terminal group 20, and transmits the voting information.

Each client terminal 20-$i$ in the client terminal group 20 is a device capable of receiving a voting service from the vote broadcasting server 10 and the confidential server 30.

The confidential server 30 is a device which transmits a pre-shared key and a user key to the client terminal group 20 which requests a vote.

<Device Configuration>

Figure 2:
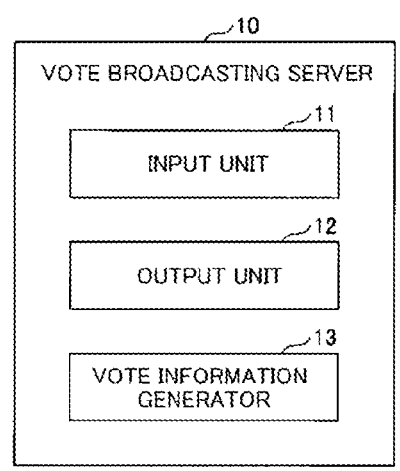
FIG. 2 is a diagram showing a configuration example of a vote broadcasting server 10 in the first embodiment.

FIG. 2 is a diagram showing a configuration of the vote broadcasting server 10. As shown in FIG. 2, the vote broadcasting server 10 includes an input unit 11, an output unit 12, and a vote information generator 13.

The input unit 11 receives and inputs voting information from individual client terminals. The output unit 12 transmits vote information and transmits a voting information group received from the individual client terminals to the client terminal group 20 in a broadcast manner. The vote information generator 13 generates vote information through a method of secret-sharing a threshold value t.

Figure 3:
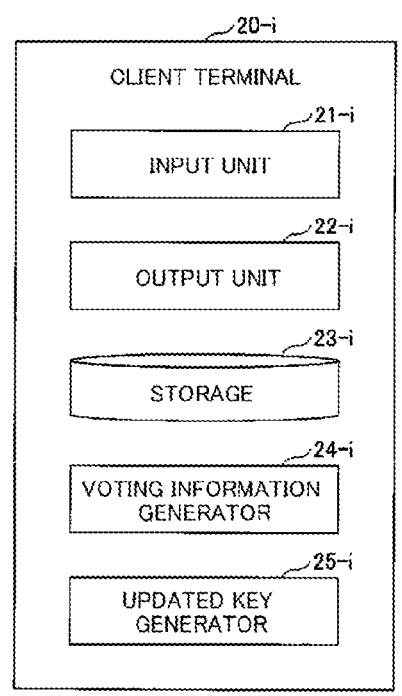
FIG. 3 is a diagram showing a configuration example of a client terminal 20-$i$ in the first embodiment.

FIG. 3 is a diagram showing a configuration of the client terminal 20-$i$. As shown in FIG. 3, the client terminal 20-$i$ includes an input unit 21-$i$, an output unit 22-$i$, a storage 23-$i$, a voting information generator 24-$i$, and an updated key generator 25-$i$. The client terminals in the client terminal group 20 have the same configuration.

The input unit 21-$i$ receives and inputs a pre-shared key and a user key from the confidential server 30. In addition, the input unit 21-$i$ receives and inputs vote information and a voting information group from the vote broadcasting server. The output unit 22-$i$ transmits voting information to the vote broadcasting server 10. The storage 23-$i$ stores the pre-shared key and the user key. The voting information generator 24-$i$ generates voting information from vote information. The updated key generator 25-$i$ updates the pre-shared key on the basis of a voting information group received from the vote broadcasting server 10.

Figure 4:
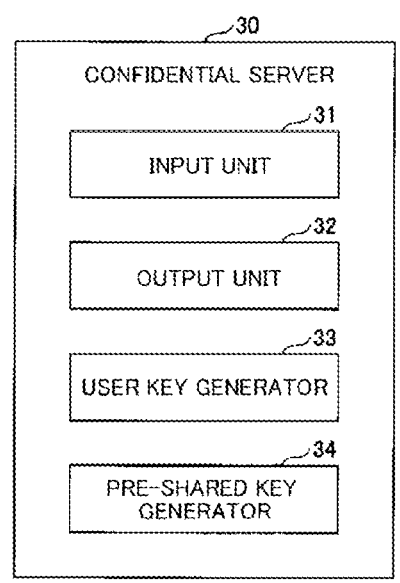
FIG. 4 is a diagram showing a configuration example of a confidential server 30 in the first embodiment.

FIG. 4 is a diagram showing a configuration of the confidential server 30. As shown in FIG. 4, the confidential server 30 includes an input unit 31, an output unit 32, a user key generator 33, and a pre-shared key generator 34.

The input unit 31 receives information and the like necessary to generate keys. The output unit 32 transmits a pre-shared key and a user key. The user key generator 33 generates a user key and the pre-shared key generator 34 generates a pre-shared key.

Each of the above-described devices (each of the vote broadcasting server 10, the client terminal 20-$i$ and the confidential server 30) may be realized, for example, by a computer executing a program in which details of processing described in the present embodiment are described.

That is, each device may be realized by executing a program corresponding to processing performed in the device using hardware resources such as a CPU and a memory included in a computer. The program may be stored or distributed by being recorded on a computer-readable recording medium (a portable memory or the like). In addition, each device may provide the program through a network such as the Internet or e-mail.

Figure 5:
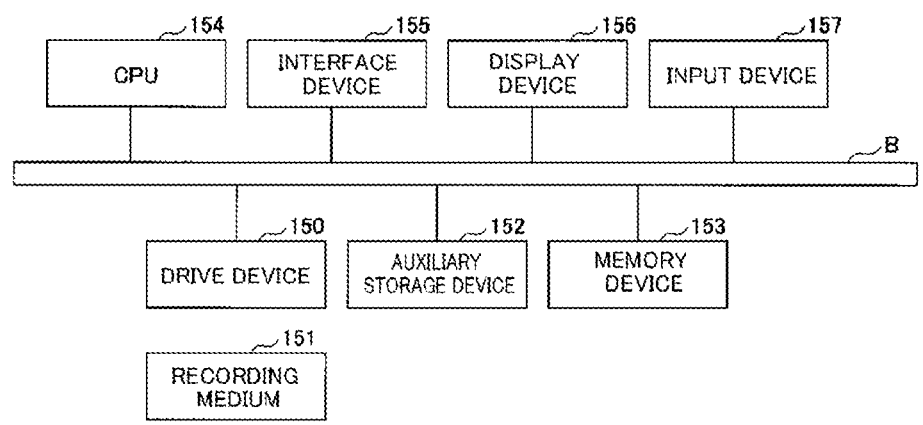
FIG. 5 is a diagram showing a hardware configuration example of an apparatus.

FIG. 5 is a diagram showing a hardware configuration example of the aforementioned computer in the present embodiment. The computer of FIG. 5 includes a drive device 150, an auxiliary storage device 152, a memory device 153, a CPU 154, an interface device 155, a display device 156, an input device 157, and the like which are connected through a bus B.

A program that realizes processing in the computer is provided, for example, on a recording medium 151 such as a CD-ROM or a memory card. When the recording medium 151 on which the program is stored is set in the drive device 150, the program is installed on the auxiliary storage device 152 through the drive device 150 from the recording medium 151. However, the program is not necessarily installed through the recording medium 151 and may be downloaded through another computer via a network. The auxiliary storage device 152 stores installed programs, necessary files and data, and the like.

The memory device 153 reads a program from the auxiliary storage device 152 and stores the read program when starting of the program is instructed. The CPU 154 realizes a function of a corresponding device according to the program stored in the memory device 153. The interface device 155 is used as an interface for connection to a network. The display device 156 displays a graphical user interface (GUI) and the like according to a program. The input device 157 is configured as a keyboard, a mouse, buttons, a touch panel, or the like and used to input various operation instructions.

Meanwhile, each device can be realized by the aforementioned computer and program in a second embodiment in the same manner.

Applied Example

Application of the voting system 1 in the present embodiment is not particularly limited. The voting system 1 is applicable to any system of any field in which exclusion of participants according to a vote is used.

An example of an application of the voting system 1 is an ad network. As described above, an ad network includes a server for advertisement distribution (referred to as an ad server) interposed between an advertiser and user terminals such that the advertiser can place an advertisement on ad network-affiliated media (websites) by submitting the advertisement to the ad server. Here, the ad network is referred to as an advertisement distribution system.

Figure 6:
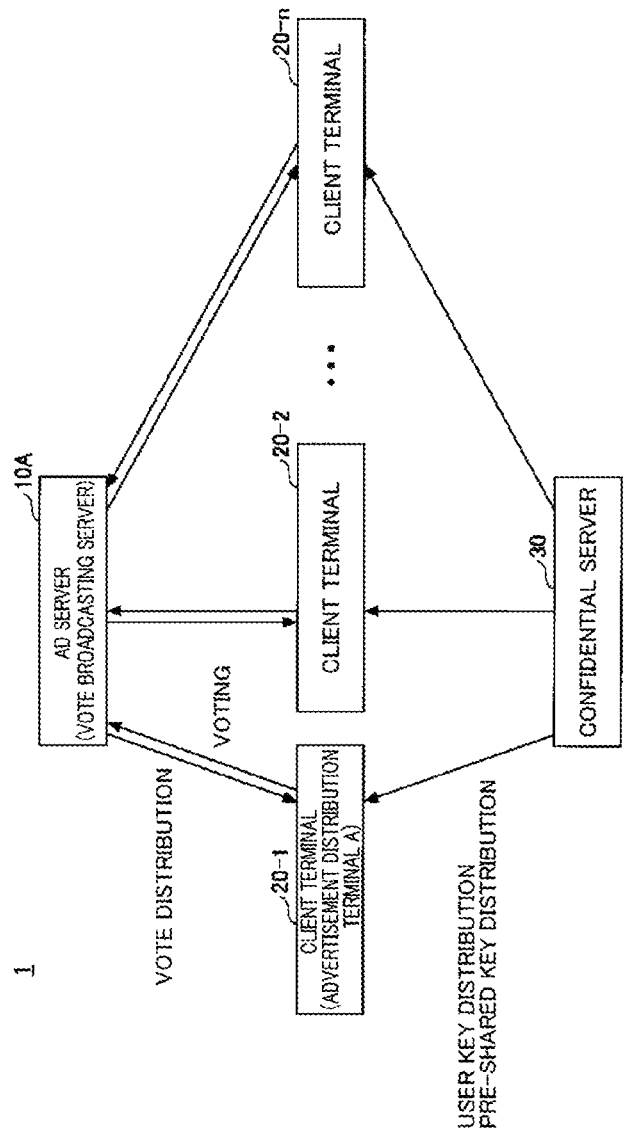
FIG. 6 is a diagram showing an applied example.

FIG. 6 is a diagram showing a configuration example of an advertisement distribution system in a case in which the voting system 1 is applied to the advertisement distribution system. As shown in FIG. 6, an ad server 10A is configured to include the function of the vote broadcasting server. The ad server 10A may be referred to as the advertisement distribution server 10A. The client terminal group 20 includes advertisement distribution terminals that are terminals of advertisers and terminals of users who read advertisements provided by advertisers. As an example, it is assumed that the client terminal 20-1 is an advertisement distribution terminal A in FIG. 6. Further, the number of advertisement distribution terminals is not limited to 1 and may be plural. Meanwhile, although a user who reads an advertisement accesses media (websites) using a client terminal and reads the advertisement, FIG. 6 shows the ad server 10A, the client terminal group 20, and the confidential server 30 as devices pertaining to the present invention.

<Operation Example of System>

Hereinafter, a processing procedure performed in the voting system 1 of the first embodiment will be described. As an example, an operation example in an advertisement distribution system will be appropriately described in the following description of the processing procedure of the voting system 1.

Figure 7:
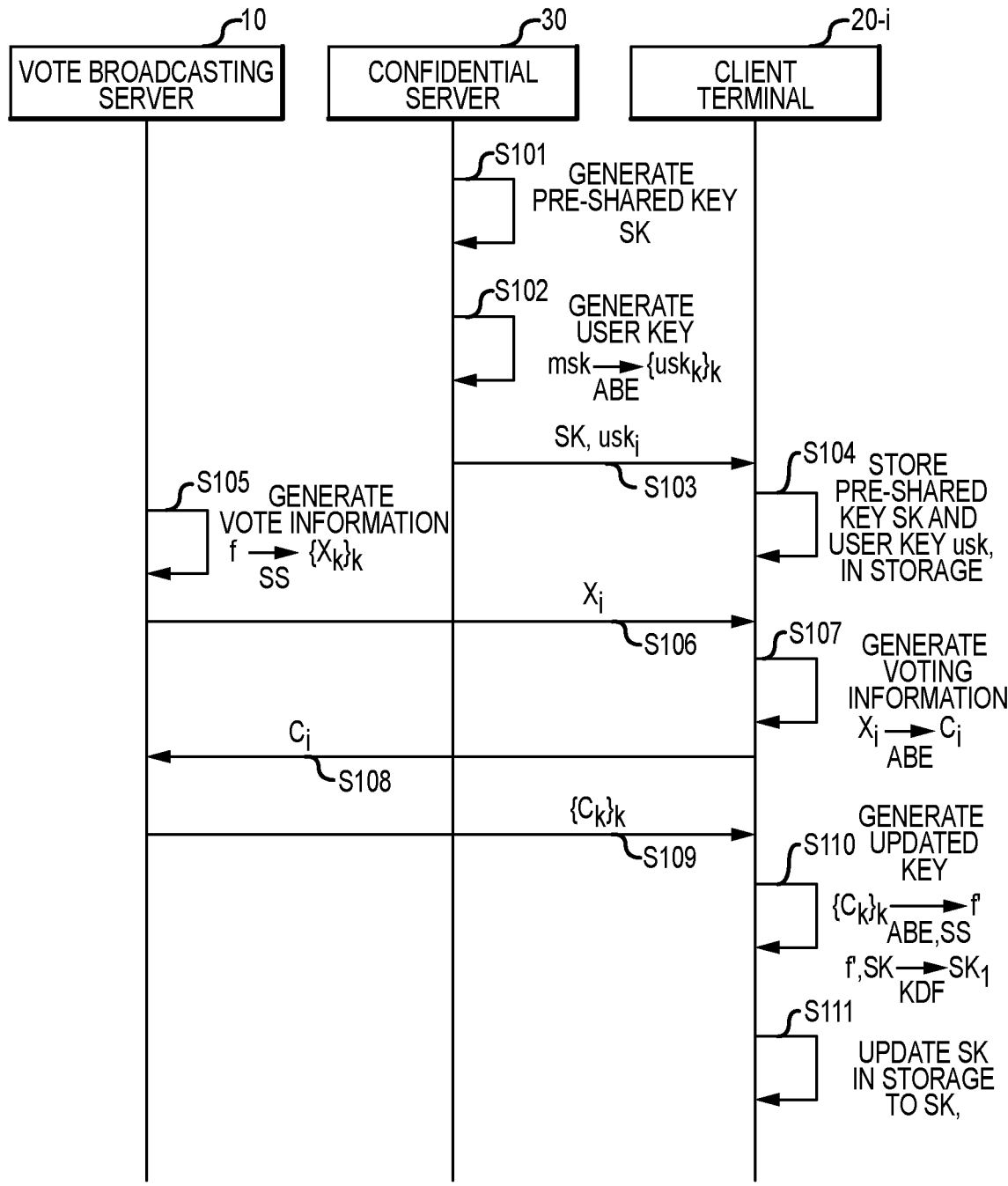
FIG. 7 is a sequence diagram for describing an example of a processing procedure in the first embodiment.

FIG. 7 is a sequence diagram for describing an example of a processing procedure in the first embodiment. In this example, it is assumed that a total number of client terminals is n. FIG. 7 shows only the client terminal 20-$i$ in the client terminal group 20 for convenience of illustration. The same processing as that in the client terminal 20-$i$ is also performed in client terminals other than the client terminal 20-$i$.

Although an example in which steps S101 to S104 are executed is illustrated in the example shown in FIG. 7, the voting system 1 may execute only S105 to S111 if steps S101 to S104 are executed in advance.

In step S101, the pre-shared key generator 34 of the confidential server 30 generates a pre-shared key SK.

In step S102, the user key generator 33 of the confidential server 30 generates a user key $\{usk_k\}_k$. Attribute-based encryption algorithm ABE={Setup, Der, AEnc, ADec}, for example, Vipul Goyal, Omkant Pandey, Amit Sahai, and Brent Waters's "Attribute-Based Encryption for Fine-Grained Access Control of Encrypted Data," CCS (2006) is used to generate the user key.

The user key is generated for each client terminal and the user key for the client terminal 20-$i$ is denoted by $usk_i$. In the present embodiment, n user keys are generated because n client terminals are present.

In step S103, the confidential server 30 transmits the pre-shared key SK and the user key $usk_i$ to the client terminal 20-$i$ through encryption communication.

In step S104, the client terminal 20-$i$ stores the pre-shared key SK and the user key $usk_i$ in the storage 23-$i$.

Meanwhile, in an example of the advertisement distribution system, the pre-shared key SK is, for example, a shared key shared between a client terminal of an advertiser (advertisement distribution terminal) and a client terminal of a user who reads an advertisement, and only the advertiser having the shared key SK can place an advertisement and only the user having the shared key SK can read the advertisement. Accordingly, when the pre-shared key SK in a client terminal group other than the client terminal 20-1 (advertisement distribution terminal A) is updated to another shared key and the pre-shared key SK of the client terminal 20-1 (advertisement distribution terminal A) is not updated, for example, the client terminal 20-1 (advertisement distribution terminal A) is excluded from advertisement placement. That is, in this case, corrupt (undesirable) advertisements distributed from the advertisement distribution terminal A are excluded.

In step S105, the vote information generator 13 of the vote broadcasting server 10 generates a secret value f and vote information $\{x_k\}_k$. $\{x_k\}_k$ is shared data of f, and Adi Shamir's "How to Share a Secret," Communications of the ACM, 1979 is used as a method of generating the vote information. In addition, it is assumed that a threshold value of secret sharing is t. Meanwhile, secret sharing used in this specification is threshold value secret sharing. For example, as many pieces of vote information as the number of client terminals, n, are generated. The vote information transmitted to the client terminal 20-$i$ is denoted by $x_i$.

In step S106, the vote broadcasting server 10 transmits the vote information $x_i$ to the client terminal 20-$i$ through encryption communication.

In step S107, the voting information generator 24-$i$ of the client terminal 20-$i$ generates voting information $c_i$=AEnc($P_i$, $x_i$). That is, the vote information $x_i$ is encrypted on the basis of an access structure (access right) using the aforementioned attribute-based encryption algorithm. The encrypted information is the voting information $c_i$. The access structure $P_i$ designates a client terminal that permits decryption of $x_i$. Processing of generating the voting information $c_i$=AEnc($P_i$, $x_i$) is an example of generating voting information by encrypting vote information such that the vote information can be decrypted when predetermined conditions are satisfied.

In the attribute-based encryption method used in the present embodiment, the vote information $x_i$ can be encrypted such that it is decrypted only by a client terminal that meets a certain condition (attribute). Designation of the condition corresponds to the access structure $P_i$.

In an example of the advertisement distribution system, the access structure $P_i$ corresponds to information representing whether to permit advertisement distribution for each advertiser. In this case, only an advertisement distribution terminal (client terminal) of an advertiser permitted to distribute an advertisement can decrypt the voting information $c_i$. For example, the advertisement distribution terminal A can decrypt only the voting information $c_i$ that permits the advertisement distributed by the advertisement distribution terminal A. Meanwhile, it is assumed that client terminals on a reading side other than advertisers can decrypt all voting information $c_i$ in this example. Accordingly, client terminals on the reading side other than advertisers can update SK.

In step S108, the client terminal 20-$i$ transmits the voting information $c_i$ to the vote broadcasting server 10.

In step S109, the vote broadcasting server 10 transmits all voting information $\{c_k\}_k$ of the client terminal group 20 to the client terminal 20-$i$. Accordingly, each client terminal in the client terminal group 20 acquires voting information $(c_i, \ldots, c_i \ldots, c_n)$ of all client terminals.

In step S110, the updated key generator 25-$i$ of the client terminal 20-$i$ restores vote information from the voting information received in S109 ($x_k \leftarrow$ADec($usk_i$, $c_k$)). However, the updated key generator 25-$i$ cannot correctly decrypt the vote information when decryption is not permitted for the client terminal 20-$i$ as described above. That is, in an example of the above-described advertisement distribution system, the advertisement distribution terminal A can correctly decrypt only voting information that permits distribution of the advertisement of the advertisement distribution terminal A from among the voting information $(c_i, \ldots, c_i \ldots, c_n)$ of all client terminals.

Next, the updated key generator 25-$i$ of the client terminal 20-$i$ calculates a secret value f' from the acquired vote information $\{x_k\}_k$. Here, the secret value f' is consistent with the secret key f issued by the vote broadcasting server 10 only when a total number of correctly acquired pieces of vote information exceeds t. The updated key generator 25-$i$ of the client terminal 20-$i$ issues an updated key SK$_1$←KDF (SK, f) through a key derivation function KDF using the pre-shared key SK stored in the storage 23-$i$ and the secret value f as inputs when the secret value f is correctly acquired (that is, when the total number of correctly acquired pieces of vote information exceeds t). Meanwhile, an operation of ascertaining that the total number of correctly acquired pieces of vote information exceeds t corresponds to an operation of acquiring a vote result, and an operation of issuing the updated key SK$_1$←KDF(SK, f) is an example of an operation of executing processing based on the vote result. Even if the total number of correctly acquired pieces of vote information does not exceed t, an operation of ascertaining it corresponds to an operation of acquiring a vote result and an operation in which the key is not updated is an example of an operation of executing processing based on the vote result.

In step S111, the updated key generator 25-$i$ of the client terminal 20-$i$ updates the pre-shared key SK stored in the storage 23-$i$ to the updated key SK$_1$.

In an example of the advertisement distribution system, if the number of client terminals which permit advertisement distribution is greater than t, the advertisement distribution terminal A can correctly decrypt a number of pieces of vote information which is greater than t and thus can acquire the updated key SK$_1$. Accordingly, the advertisement distribution system can continue advertisement distribution.

On the other hand, if the number of client terminals which permit advertisement distribution is equal to or less than t, the advertisement distribution terminal A cannot correctly decrypt a number of pieces of vote information which is greater than t and thus cannot acquire the updated key SK$_1$, and the pre-shared key SK is not updated. Accordingly, the client terminal is excluded from advertisement distribution.

Second Embodiment

Next, a second embodiment will be described on the basis of the drawings.

<System Configuration>

Figure 8:
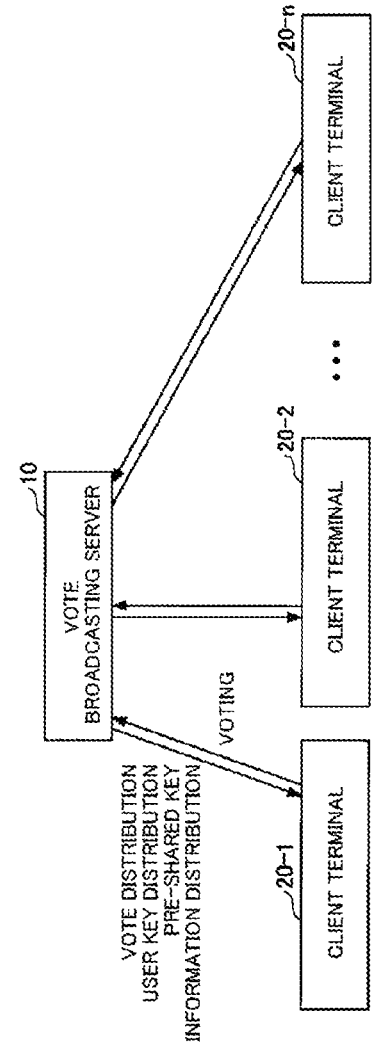
FIG. 8 is a diagram showing a configuration example of a voting system in a second embodiment.

FIG. 8 is a diagram showing a configuration example of a voting system 2 in the second embodiment.

As shown in FIG. 8, the voting system 2 includes a vote broadcasting server 10, a client terminal group 20 including two or more client terminals such as client terminals 20-1 and 20-2, and the like. The vote broadcasting server 10 and the client terminal group 20 are connected via a network. In addition, it is assumed that authentication is performed between the vote broadcasting server 10 and the client terminal group 20 according to a public key infrastructure or the like.

The vote broadcasting server 10 is a device which transmits pre-shared key information, a user key, and vote information to the client terminal group 20 which requests a vote, receives voting information from the client terminal group 20, and transmits the voting information.

Each client terminal 20-$i$ in the client terminal group 20 is a device capable of receiving a voting service from the vote broadcasting server 10.

<Device Configuration>

Figure 9:
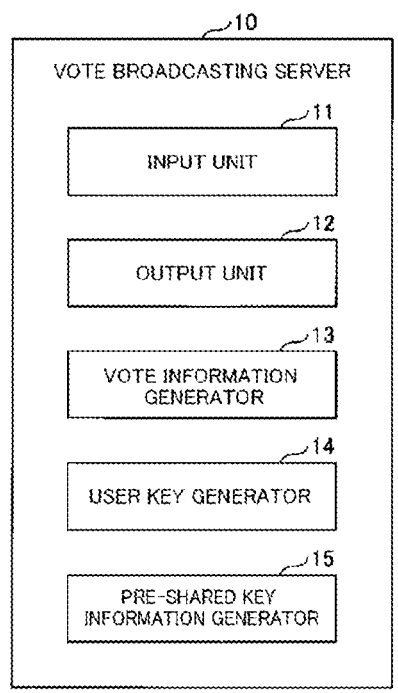
FIG. 9 is a diagram showing a configuration example of a vote broadcasting server 10 in the second embodiment.

FIG. 9 is a diagram showing a configuration of the vote broadcasting server 10. As shown in FIG. 9, the vote broadcasting server 10 includes an input unit 11, an output unit 12, a vote information generator 13, a user key generator 14, and a pre-shared key information generator 15.

The input unit 11 receives and inputs encrypted voting information from individual client terminals. The output unit 12 transmits vote information and transmits a voting information group received from the individual client terminals to the client terminal group 20 in a broadcast manner. In addition, the output unit 12 transmits pre-shared key information and a user key. The vote information generator 13 generates vote information through a method of secret-sharing a threshold value t. The user key generator 14 generates user keys and the pre-shared key information generator 15 generates pre-shared key information.

Figure 10:
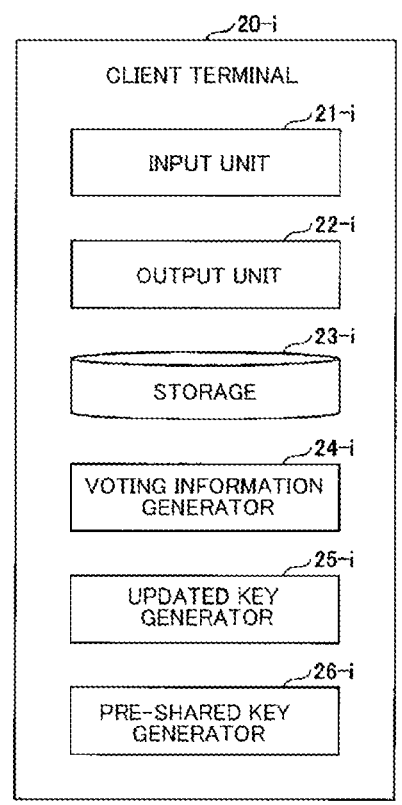
FIG. 10 is a diagram showing a configuration example of a client terminal 20-$i$ in the second embodiment.

FIG. 10 is a diagram showing a configuration of the client terminal 20-$i$. As shown in FIG. 10, the client terminal 20-$i$ includes an input unit 21-$i$, an output unit 22-$i$, a storage 23-$i$, a voting information generator 24-$i$, an updated key generator 25-$i$, and a pre-shared key generator 26-$i$.

The input unit 21-$i$ receives and inputs pre-shared key information and a user key from the vote broadcasting server 10. In addition, the input unit 21-$i$ receives and inputs vote information and a voting information group from the vote broadcasting server 10. The output unit 22-$i$ transmits voting information to the vote broadcasting server 10. The storage 23-$i$ stores the pre-shared key information, the pre-shared key, and the user key. The voting information generator 24-$i$ generates voting information from vote information. The updated key generator 25-$i$ updates a pre-shared key on the basis of a voting information group received from the vote broadcasting server 10. The pre-shared key generator 26-$i$ generates a pre-shared key from the pre-shared key information.

Applied Example

Application of the voting system 2 in the present embodiment is not particularly limited. The voting system 2 is applicable to any system of any field in which exclusion of participants according to a vote is used.

An example of an application of the voting system 2 is an ad network (advertisement distribution system) as in the first embodiment.

Figure 11:
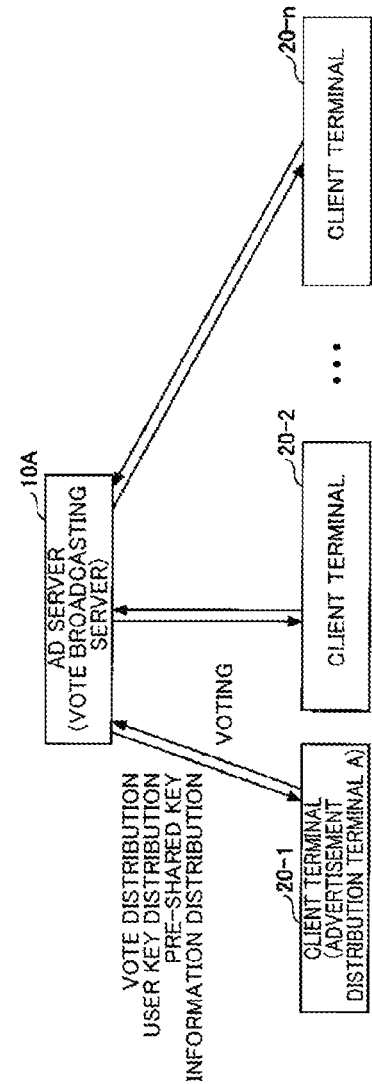
FIG. 11 is a diagram showing an applied example.

FIG. 11 is a diagram showing a configuration example of an advertisement distribution system in a case in which the voting system 2 is applied to the advertisement distribution system. As shown in FIG. 11, an ad server 10A is configured to include the function of the vote broadcasting server. The ad server 10A may be referred to as the advertisement distribution server 10A. The client terminal group 20 includes advertisement distribution terminals that are terminals of advertisers and terminals of users who read advertisements provided by advertisers. As an example, it is assumed that the client terminal 20-1 is an advertisement distribution terminal A in FIG. 11. Further, the number of advertisement distribution terminals is not limited to 1 and may be plural. Meanwhile, although a user who reads an advertisement accesses media (websites) using a client terminal and reads the advertisement, FIG. 11 shows the ad server 10A and the client terminal group 20 as devices pertaining to the present invention.

<Operation Example of System>

Hereinafter, a processing procedure performed in the voting system 2 of the second embodiment will be described. As an example, an operation example in an advertisement distribution system will be appropriately described in the following description of the processing procedure of the voting system 1.

Figure 12:
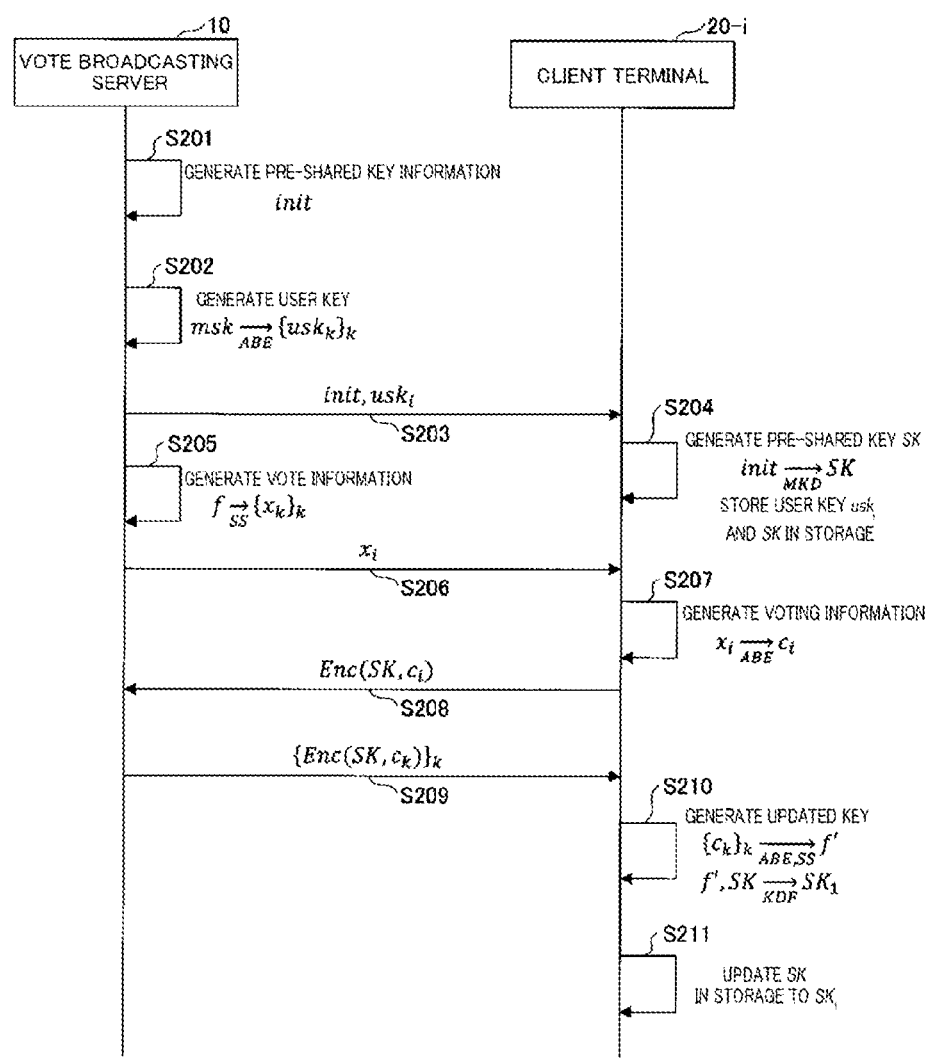
FIG. 12 is a sequence diagram for describing an example of a processing procedure in the second embodiment.

FIG. 12 is a sequence diagram for describing an example of a processing procedure in the second embodiment. In this example, it is assumed that a total number of client terminals is n (n is an integer equal to or greater than 2). FIG. 12 shows only the client terminal 20-$i$ in the client terminal group 20 for convenience of illustration. The same processing as that in the client terminal 20-$i$ is also performed in client terminals other than the client terminal 20-$i$.

Although an example when steps S201 to S204 are executed is illustrated in the example shown in FIG. 12, the voting system 2 may execute only S205 to S211 if steps S201 to S204 are executed in advance.

In step S201, the pre-shared key information generator 15 of the vote broadcasting server 10 generates pre-shared key information init.

In step S202, the user key generator 14 of the vote broadcasting server 10 generates a user key $\{usk_k\}_k$. As in the first embodiment, attribute-based encryption algorithm ABE-{Setup, Der, AEnc, ADec} is used to generate the user key.

The user key is generated for each client terminal and the user key for the client terminal 20-$i$ is denoted by $usk_i$. In the present embodiment, n user keys are generated because n client terminals are present.

In step S203, the vote broadcasting server 10 transmits the pre-shared key information init and the user key $usk_i$ to the client terminal 20-$i$ through encryption communication.

In step S204, the pre-shared key generator 20-$i$ of the client terminal 20-$i$ generates a pre-shared key SK through a multi-key distribution function MKD using the pre-shared key information init as an input while keeping it secret from the vote broadcasting server 10. For example, Kazuki Yoneyama, Reo Yoshida, Yuto Kawahara, Tetsutaro Kobayashi, Hitoshi Fuji, Tomohide Yamamoto, Multi-Cast Key Distribution: Scalable, Dynamic and Provably Secure Construction, ProvSec (2016) is used for multi-key distribution. The generated pre-shared key SK and the user key $usk_i$ are stored in the storage 23-$i$. In an example of the advertisement distribution system, the pre-shared key SK plays the same role as that described in the first embodiment.

In step S205, the vote information generator 13 of the vote broadcasting server 10 generates a secret value f and vote information $\{x_k\}_k$. $\{x_k\}_k$ is shared data of f. It is assumed that a threshold value of secret sharing is t. For example, as many pieces of vote information as the number of client terminals, n, are generated. The vote information transmitted to the client terminal 20-$i$ is denoted by $x_i$.

In step S206, the vote broadcasting server 10 transmits the vote information $x_i$ to the client terminal 20-$i$ through encryption communication.

In step S207, the voting information generator 24-$i$ of the client terminal 20-$i$ generates voting information $c_i$=AEnc($P_i$, $x_i$). The access structure $P_i$ designates a client terminal that permits decryption of $x_i$. Processing of generating the voting information $c_i$=AEnc($P_i$, $x_i$) is an example of generating voting information by encrypting vote information such that the vote information can be decrypted when predetermined conditions are satisfied. The access structure $P_i$ in an example of the advertisement distribution system is the same as that described in the first embodiment.

In step S208, the client terminal 20-$i$ encrypts the voting information $c_i$ using the pre-shared key SK (Enc(SK, $c_i$)) and transmits the encrypted voting information to the vote broadcasting server 10. However, Enc is encryption using a shared key encryption method.

In step S209, the vote broadcasting server 10 transmits all encrypted voting information $\{Enc(SK, c_k)\}_k$ of the client terminal group 20 to the client terminal 20-$i$. Accordingly, each client terminal in the client terminal group 20 acquires voting information (Enc(SK, $c_i$), . . . , Enc(SK, $c_i$) . . . , Enc(SK, $c_n$)) of all client terminals.

In step S210, the updated key generator 25-$i$ of the client terminal 20-$i$ decrypts the voting information received in S209 using SK and restores vote information from the decrypted voting information ($x_k$←ADec($usk_i$, $c_k$)). However, correct decryption cannot be performed when decryption in the client terminal 20-$i$ is not permitted.

Next, the updated key generator 25-$i$ of the client terminal 20-$i$ calculates a secret value f' from the acquired vote information $\{x_k\}_k$. Here, only when a total number of correctly acquired pieces of vote information exceeds t, the secret value f' is consistent with the secret key f issued by the vote broadcasting server 10. The updated key generator 25-$i$ of the client terminal 20-$i$ issues an updated key $SK_1$←KDF (SK, f) through a key derivation function KDF using the pre-shared key SK stored in the storage 23-$i$ and the secret value f as inputs when the secret value f is correctly acquired (that is, when the total number of correctly acquired pieces of vote information exceeds t). Meanwhile, an operation of ascertaining that the total number of correctly acquired pieces of vote information exceeds t corresponds to an operation of acquiring a vote result, and an operation of issuing the updated key $SK_1$←KDF(SK, f) is an example of an operation of executing processing based on the vote result. Even if the total number of correctly acquired pieces of vote information does not exceed t, an operation of ascertaining it corresponds to an operation of acquiring a vote result and an operation in which the key is not updated is an example of an operation of executing processing based on the vote result.

In step S211, the updated key generator 25-$i$ of the client terminal 20-$i$ updates the pre-shared key SK stored in the storage 23-$i$ to the updated key $SK_1$. An example in the advertisement distribution system is the same as the first embodiment.

Summary of Embodiments

As described above, according to the present embodiment, there is provided a voting system including a vote broadcasting server and a plurality of client terminals, in which the vote broadcasting server generates a plurality of pieces of vote information that is data in which secret information is shared and transmits the vote information to each client terminal, each client terminal generates voting information by encrypting vote information such that the vote information can be decrypted when predetermined conditions are satisfied and transmits the voting information to the vote broadcasting server, the vote broadcasting server transmits a voting information group composed of voting information received from respective client terminals to the respective client terminals, and each client terminal ascertains a vote result according to the number of pieces of vote information decrypted from the voting information group and executes processing based on the vote result.

Furthermore, according to the present embodiment, there is provided a vote broadcasting server in a voting system including the vote broadcasting server and a plurality of client servers, the vote broadcasting server including: generation means for generating a plurality of pieces of vote information that is data in which secret information is shared; transmission means for transmitting the vote information to each client terminal; and reception means for receiving, from each client terminal, voting information acquired by encrypting the vote information such that the vote information can be decrypted when predetermined conditions are satisfied, wherein the transmission means transmits a voting information group composed of voting information received from respective client terminals to the respective client terminals.

The vote information generator 13 is an example of the generation means, the output unit 12 is an example of the transmission means, and the input unit 11 is an example of the reception means.

In addition, according to the present embodiment, there is provided a client terminal in a voting system including a vote broadcasting server and a plurality of client servers, the client terminal including: reception means for receiving, from the vote broadcasting server, one of a plurality of pieces of vote information that is data in which secret information is shared; a transmission means for generating voting information by encrypting the vote information such that the vote information can be decrypted when predetermined conditions are satisfied and transmitting the voting information to the vote broadcasting server; and processing means for receiving, from the vote broadcasting server, a voting information group composed of voting information transmitted from respective client terminals, ascertaining a vote result according to the number of pieces of vote information decrypted from the voting information group and executing processing based on the vote result.

The input unit 21-$i$ is an example of the reception means. The voting information generator 24-$i$ and the output unit 22-$i$ are an example of the transmission means, and the updated key generator 25-$i$ and the input unit 21-$i$ are an example of the processing means.

Furthermore, according to the present embodiment, there is provided a voting method performed by a voting system including a vote broadcasting server and a plurality of client terminals, in which the vote broadcasting server generates a plurality of pieces of vote information that is data in which secret information is shared and transmits the vote information to each client terminal, each client terminal generates voting information by encrypting vote information such that the vote information can be decrypted when predetermined conditions are satisfied and transmits the voting information to the vote broadcasting server, the vote broadcasting server transmits a voting information group composed of voting information received from respective client terminals to the respective client terminals, and each client terminal ascertains a vote result according to the number of pieces of vote information decrypted from the voting information group and executes processing based on the vote result.

Furthermore, according to the present embodiment, there is provided an advertisement distribution system including an advertisement distribution server and a plurality of client terminals, in which the advertisement distribution server generates a plurality of pieces of vote information that is data in which secret information is shared and transmits the vote information to each client terminal, each client terminal generates voting information by encrypting vote information such that the vote information can be decrypted when predetermined conditions with respect to permission of advertisement distribution are satisfied and transmits the voting information to the advertisement distribution server, the advertisement distribution server transmits a voting information group composed of voting information received from respective client terminals to the respective client terminals, and each client terminal acquires the secret information and updates a shared key for advertisement distribution on the basis of the secret information when the number of pieces of vote information decrypted from the voting information group exceeds a predetermined threshold value.

Furthermore, according to the present embodiment, there is provided a program causing a computer to serve as each means in the vote broadcasting server and a program causing a computer to serve as each means in the client terminal.

According to the above-described technology, it is possible to exclude a participant while concealing information from a server side in End-to-End encryption communication via a server.

While the present embodiment has been described, the present invention is not limited to such a specific embodiment and various modifications and substitutions can be made without departing from the spirit or scope of the present invention.

REFERENCE SIGNS LIST 1,2 Voting system
10 Vote broadcasting server
10A Ad server
20 Client terminal group
20-1 to 20-$n$ Client terminal
30 Confidential server
11 to 15 Components of vote broadcasting server
21-$i$ to 26-$i$ Components of client terminal 20-$i$
31 to 34 Components of confidential server
S101 to S111 Steps of voting system 1
S201 to S211 Steps of voting system 2
150 Drive device
151 Recording medium
152 Auxiliary storage device
153 Memory device
154 CPU
155 Interface device
156 Display device
157 Input device

The invention claimed is:

1. A computer-implemented method for processing one or more votes, the method comprising:
generating, by a server, a plurality of votes, wherein the plurality of votes includes secret information for distribution among a plurality of client terminals;
transmitting, by the server, a vote of the plurality of votes to a client terminal of the plurality of client terminals using an encrypted data communication, causing the client terminal to receive and encrypt the vote using at least a user key associated with the client terminal
receiving, by the server, a plurality of encrypted votes, wherein the plurality of encrypted votes includes the encrypted vote by the client terminal, and each encrypted vote of the plurality of encrypted votes is decryptable by the client terminal according to a predetermined condition; and
transmitting the plurality of encrypted votes to the client terminal, causing the client terminal to decrypt the plurality of the encrypted votes according to the predetermined condition and to determine a voting result based on a number of the plurality of votes.

2. The computer-implemented method of claim 1, wherein the server includes a vote relay server, and wherein the client terminal represents a voting client terminal.

3. The computer-implemented method of claim 2, the method further comprising:
  generating, by the server, the user key;
  generating, by the server, a shared key; and
  transmitting the user key and the shared key.

4. The computer-implemented method of claim 2, the method further comprising:
  transmitting the plurality of encrypted votes, causing the client terminal to decrypt each encrypted vote of the plurality of encrypted votes and identify a secret key and a number of votes.

5. The computer-implemented method of claim 2, wherein the encrypted vote includes secret information.

6. The computer-implemented method of claim 2, wherein the server includes a directed information distributions sever, and wherein the directed information includes advertisement information, and wherein the client terminal receives the directed information.

7. The computer-implemented method of claim 6, wherein the predetermined condition includes a number of terminal clients participating in voting.

8. A system for relaying votes, the system comprises:
  a processor; and
  a memory storing computer-executable instructions that when executed by the processor cause the system to:
    generate, by a server, a plurality of votes, wherein the plurality of votes includes secret information for distribution among a plurality of client terminals;
    transmit, by the server, a vote of the plurality of votes to a client terminal of the plurality of client terminals using an encrypted data communication, causing the client terminal to receive and encrypt the vote using at least a user key associated with the client terminal;
    receive, by the server, a plurality of encrypted votes, wherein the plurality of encrypted votes includes the encrypted vote by the terminal, and each encrypted vote of the plurality of encrypted votes is decryptable by the client terminal according to a predetermined condition; and
    transmit the plurality of encrypted votes to the client terminal, causing the client terminal to decrypt the plurality of the encrypted votes according to the predetermined condition and to determine a voting result based on a number of the plurality of votes.

9. The system of claim 8, wherein the server includes a vote relay server, and wherein the client terminal represents a voting client terminal.

10. The system of claim 8, the computer-executable instructions when executed further causing the system to:
  generate, by the server, the user key;
  generate, by the server, a shared key; and
  transmit the user key and the shared key.

11. The system of claim 8, the computer-executable instructions when executed further causing the system to:
  transmit the plurality of encrypted votes, causing the client terminal to decrypt each encrypted vote of the plurality of encrypted votes and identify a secret key and a number of votes.

12. The system of claim 8, wherein the encrypted vote includes secret information.

13. The system of claim 8, wherein the server includes a directed information distributions sever, wherein the directed information includes advertisement information, and wherein the client terminal relate to receives the directed information.

14. The system of claim 13, wherein the predetermined condition includes a number of terminal clients participating in voting.

15. A computer-readable non-transitory recording medium storing computer-executable instructions that when executed by a processor cause a computer system to:
  generate, by a server, a plurality of votes, wherein the plurality of votes includes secret information for distribution among a plurality of client terminals;
  transmit, by the server, a vote of the plurality of votes to a client terminal of the plurality of client terminals using an encrypted data communication, causing the client terminal to receive and encrypt the vote using at least a user key associated with the client terminal;
  receive, by the server, a plurality of encrypted votes, wherein the plurality of encrypted votes includes the encrypted vote by the client terminal, and each encrypted vote of the plurality of encrypted votes is decryptable by the client terminal according to a predetermined condition; and
  transmit the plurality of encrypted votes to the client terminal, causing the client terminal to decrypt the plurality of the encrypted votes according to the predetermined condition and to determine a voting result based on a number of the plurality of votes.

16. The computer-readable non-transitory recording medium of claim 15, wherein the server includes a vote relay server, and wherein the client terminal represents voting client terminal.

17. The computer-readable non-transitory recording medium of claim 15, the computer-executable instructions when executed further causing the system to:
  generate, by the server, the user key;
  generate, by the server, a shared key; and
  transmit the user key and the shared key.

18. The computer-readable non-transitory recording medium of claim 15, the computer-executable instructions when executed further causing the system to:
  transmit the plurality of encrypted votes, causing the client terminal to decrypt each encrypted vote of the plurality of encrypted votes and identify a secret key and a number of votes.

19. The computer-readable non-transitory recording medium of claim 15, wherein the encrypted vote includes secret information.

20. The computer-readable non-transitory recording medium of claim 15,
  wherein the server includes a directed information distributions sever, wherein the directed information includes advertisement information, and wherein the client terminal receives the directed information, and
  wherein the predetermined condition includes a number of terminal clients participating in voting.

* * * * *